United States Patent
Itoh et al.

(10) Patent No.: US 8,317,338 B2
(45) Date of Patent: Nov. 27, 2012

(54) IMAGE DISPLAY APPARATUS AND IMAGE DISPLAY METHOD

(75) Inventors: Tatsuo Itoh, Osaka (JP); Kenichi Kasazumi, Osaka (JP)

(73) Assignee: Panasonic Corporation, Osaka (JP)

( * ) Notice: Subject to any disclaimer, the term of this patent is extended or adjusted under 35 U.S.C. 154(b) by 755 days.

(21) Appl. No.: 12/409,625

(22) Filed: Mar. 24, 2009

(65) Prior Publication Data
US 2009/0316115 A1    Dec. 24, 2009

(30) Foreign Application Priority Data
Mar. 28, 2008  (JP) ................................ 2008-086054

(51) Int. Cl.
G03B 21/00 (2006.01)
(52) U.S. Cl. ................................ 353/67; 359/13; 345/8
(58) Field of Classification Search ............. 353/67; 359/69, 15, 221, 630, 205, 13, 14; 345/7–9
See application file for complete search history.

(56) References Cited

U.S. PATENT DOCUMENTS 6,008,781 A * 12/1999 Furness et al. ................. 345/8
7,641,342 B2 * 1/2010 Eberl et al. .................... 351/221
7,834,867 B2 * 11/2010 Sprague et al. ............... 345/204
2004/0012853 A1 * 1/2004 Garcia et al. .................. 359/485

FOREIGN PATENT DOCUMENTS

| JP | 07-128613 | 5/1995 |
| JP | 11-197109 | 7/1999 |
| JP | 2001-027740 | 1/2001 |

* cited by examiner

Primary Examiner — Georgia Y Epps
Assistant Examiner — Jerry Brooks
(74) Attorney, Agent, or Firm — Wenderoth, Lind & Ponack, L.L.P.

(57) ABSTRACT

An image display apparatus and method constantly maintain a desired image formation state on a retina. The apparatus includes a laser light source for emitting laser light, a focus position adjustment section for adjusting a focus position of the laser light, and a scanning section for scanning an area by using the adjusted laser light as scanning light. The apparatus also includes a light deflection section for leading the scanning light to a user's cornea, a light detection section having an optically conjugate relation with the cornea surface through the light deflection section, for detecting a part the scanning light reflected on the cornea surface and generating a detection signal, and a control section. The control section controls the focus position adjustment section to adjust the focus position of the laser light such that the detection signal agrees with an initial setting signal.

14 Claims, 5 Drawing Sheets

TO-BE-SCANNED AREA 60

IMAGE DISPLAY APPARATUS AND IMAGE DISPLAY METHOD

BACKGROUND OF THE INVENTION

1. Field of the Invention

The present invention relates to a head-mounted display and the like, and more particularly, to an image display apparatus and an image display method by which a person can view a clear image with the naked eye.

2. Description of the Background Art

An image display apparatus as typified by a head-mounted display (hereinafter, referred to as an HMD) is a mobile display terminal for personal use, and has an eyeglass-shaped structure for easy wearing.

Here, there are individual differences in human eyes (eyesight, curved shape of retina, etc.), and failure of image formation on the retina may occur due to the individual differences.

As a technology for eliminating the above failure of image formation to obtain a desired image formation state, for example, there is a technology disclosed in Japanese Patent Laid-Open Publication No. H07-128613. In the technology in Japanese Patent Laid-Open Publication No. H07-128613, a liquid crystal display, a light source constituted of an LED array, and a light blocking element for blocking a part of light incident on a detector are arranged at optically conjugate positions, and a magnifying lens for magnifying an image is driven by using a lens driving section. Thus, a desired image formation state on a retina can be constantly obtained, thereby reducing the fatigue of an eye.

Further, as another technology for eliminating the above failure of image formation to obtain a desired image formation state, for example, there is a technology disclosed in Japanese Patent Laid-Open Publication No. 2001-27740. In the technology in Japanese Patent Laid-Open Publication No. 2001-27740, prisms are arranged as light deflection means for the X axis and Y axis, respectively, and automatic focus adjustment is performed by driving a light collection optical system using optical system driving means, and hence, a desired image formation state on a retina can be constantly obtained. Thus, the technology in Japanese Patent Laid-Open Publication No. 2001-27740 can eliminate the need for optical adjustment (visibility, aberration correction, etc.) in accordance with characteristics of eyes, such as shortsightedness, farsightedness, astigmatism, and the like.

Further, although not being a technology for eliminating the above failure of image formation to obtain a desired image formation state, for example, there is a technology disclosed in Japanese Patent Laid-Open Publication No. H11-197109 as a technology for scanning laser ophthalmoscopes. In the technology in Japanese Patent Laid-Open Publication No. H11-197109, the focus position of laser light is adjusted to a predetermined area of a tested eye by mechanically moving an optical system, which includes a laser light source and a scanning section, while maintaining an optically conjugate relation of a galvanometer mirror constituting the scanning section with the pupil of the tested eye. Thus, in the technology in Japanese Patent Laid-open Publication No. H11-197109, a confocal optical system can be constituted of a simple optical system and a movement mechanism, and a scanning laser ophthalmoscope with remarkably improved image contrast and resolution can be provided at a low cost.

In any of the conventional technologies described above, reflected light from a retina is detected for performing focus adjustment of scanning light. Further, the conventional image display apparatuses described above adjust an image formation state on the retina by detecting the reflected light from the retina and adjusting the focus of the scanning light. Here, even when the scanning light is incident on the retina from the view line direction (the front direction of an eyeball) of a viewer (a user whose eye is scanned), namely, even when specularly reflected light from the retina is obtained, the amount of the reflected light from the retina is very small. Further, when the scanning light is incident on the retina from the direction inclined at an angle with respect to the view line direction of the viewer, namely, when specularly reflected light from the retina is not obtained, the amount of the reflected light from the retina is extremely small. Thus, in the conventional technology, detection error of the reflected light from the retina is large, and hence, the focus adjustment of the scanning light may not be performed accurately and an image formation state on the retina may not be adjusted accurately. Further, particularly, in the peripheral visual field of the user in which specularly reflected light is not obtained from the retina, an image formation state on the retina may be not adjusted.

SUMMARY OF THE INVENTION

Therefore, an object of the present invention is to provide an HMD-type image display apparatus and an image display method, for solving the above problems, by which focus adjustment of scanning light can be performed accurately, thereby constantly maintaining a desired image formation state on a retina.

The present invention is directed to an image display apparatus for displaying an image by irradiating an eye of a user with laser light. In order to attain the object mentioned above, the image display apparatus of the present invention comprises a laser light source for emitting laser light; a focus position adjustment section for adjusting a focus position of the laser light by adjusting a spread angle of the laser light, emitted by the laser light source; a scanning section for scanning a predetermined to-be-scanned area by using the laser light adjusted by the focus position adjustment section as scanning light; a light deflection section disposed at the predetermined to-be-scanned area for leading the scanning light to a cornea of the user; a light detection section disposed at a position where the light detection section has an optically conjugate relation, with a surface of the cornea through the light deflection section, for detecting, as a reflected light, a part of the scanning light reflected on the surface of the cornea and generating a detection signal; and a control section for controlling the laser light source, the focus position adjustment section, and the scanning section. The control section controls the focus position adjustment section to adjust the focus position of the laser light such that the detection signal generated by the light detection section agrees with an initial setting signal that is generated in advance by the light detection section during an initial setting operation.

Further, the image display apparatus of the present invention comprises: an adjustment section for, during the initial setting operation, focusing the scanning light on the retina of the eye of the user by operating the focus position adjustment section in accordance with an instruction from the user and adjusting the focus position of the laser light; and a storage section for, during the initial setting operation, storing a detection signal generated by the light detection section in a state where the scanning light is focused on the retina of the eye of the user, as an initial setting signal.

Further, preferably, during the initial setting operation, the adjustment section sequentially adjusts the focus position of the laser light for each of regions in the predetermined to-bescanned area in accordance with an instruction from the user who looks straight at the center of the predetermined to-be-scanned area, thereby sequentially focusing the scanning light on the retina of the eye of the user for each of the regions; and during the initial setting operation, the storage section stores, as an initial setting signal constituted of a plurality of values respectively corresponding to the regions, a plurality of detection signals each generated by the light detection section in a state where the scanning light is focused on the retina of the eye of the user for each of the regions in the predetermined to-be-scanned area.

Further, preferably, the control section detects a view line direction of the user by detecting a peak of an amount of the reflected light detected by the light detection section, and changes a value of the initial setting signal, which is used for focus position adjustment performed by the focus position adjustment section, for each of the regions in the predetermined to-be-scanned area so as to follow a change of the detected view line direction.

Further, preferably, the control section detects the view line direction of the user by detecting a peak of an amount of the reflected light detected by the light detection section, and controls the focus position adjustment section to increase adjustment accuracy of the focus position during projecting of an image in a region of the detected view line direction, and to decrease the adjustment accuracy of the focus position during projecting of an image in another region.

Further, preferably, the control section detects the view line direction of the user by detecting a peak of an amount of the reflected light detected by the light detection section, and controls the laser light source to increase the resolution of an image during projecting of an image in a region of the detected view line direction, and to decrease the resolution of an image during projecting of an image in another region.

Further, preferably, the focus position adjustment section is disposed so as not to block the scanning light and the reflected light.

Further, preferably, the scanning section includes a polarized light reflection mirror and a quarter wavelength plate, reflects the laser light, and allows the reflected light to pass therethrough.

Further, preferably, the light detection section is disposed on a back surface of the scanning section that is opposite to a surface of the scanning section that reflects the laser light, and detects the reflected light that has passed through the scanning section.

Further, preferably, the light deflection section includes a hologram mirror.

Further, preferably, the laser light source is an RGB light source including a red laser light source, a green laser light source, and a blue laser light source.

Further, preferably, the green laser light source is an SMG laser light source.

Further, the present invention is directed to an image display method for displaying an image by irradiating an eye of a user with laser light. In order to attain the object mentioned above, the image display method of the present invention comprises: a laser-emitting step of emitting laser light; a focus position adjustment step of adjusting a focus position of the laser light by adjusting a spread angle of the laser light emitted at the laser-emitting step; a scanning step of scanning a predetermined to-be-scanned area by using the laser light adjusted at the focus position adjustment step; a light deflection step of leading the scanning light, which has scanned the predetermined to-be-scanned area, to a cornea of the user, and a light detection step of at a position where there is an optically conjugate relation with a surface of the cornea through the predetermined to-be-scanned area, detecting, as reflected light, a part of the scanning light reflected on the surface of the cornea and generating a detection signal. At the focus position adjustment step, the focus position of the laser light is adjusted such that the detection signal generated at the light detection step agrees with an initial setting signal generated in advance during an initial setting operation for the light detection.

As described above, the image display apparatus and the image display method of the present invention perform focus adjustment of laser light, which is used for scanning, by using reflected light from a cornea whose amount is relatively large. Thus, the image display apparatus and the image display method of the present invention can accurately perform focus adjustment of the scanning light for the entire visual field of the user, thereby constantly maintaining a desired image formation state on the retina.

These and other objects, features, aspects and advantages of the present invention will become more apparent from the following detailed description of the present invention when taken in conjunction with the accompanying drawings.

DETAILED DESCRIPTION OF THE INVENTION

First Embodiment

Figure 1:
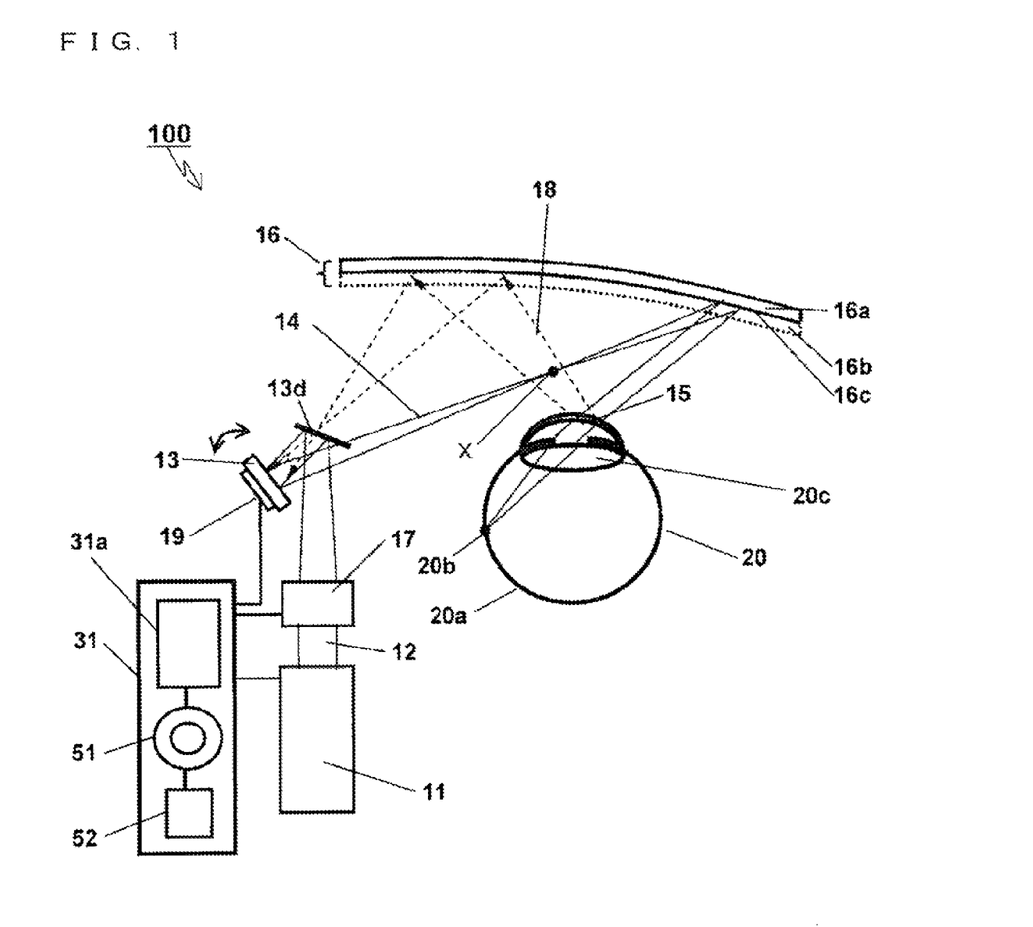
FIG. 1 shows an example of a schematic configuration of an image display apparatus 100 according to a first embodiment of the present invention.

FIG. 1 shows an example of a schematic configuration of an image display apparatus 100 according to a first embodiment. First, the image display apparatus 100 will be described briefly with reference to FIG. 1. As shown in FIG. 1, the image display apparatus 100 includes a laser light source 11, a focus position adjustment section 17, a reflection mirror 13d, a scanning section 13, a light deflection section 16, a light detection section 19, and a control part 31. The control part 31 includes a control section 31a, an adjustment section 51, and a storage section 52. In FIG. 1, an eye 20 of a viewer (hereinafter, referred to as a user) whose eye is scanned is shown.

The laser light source 11 emits laser light 12 for projecting an image on the retina 20a of the eye 20, and changes the intensity and the color of the laser light 12 in accordance with control of the control part 31.

The focus position adjustment section 17 adjusts the focus position of the laser light 12 by changing the spread angle of the laser light 12, which is emitted by the laser light source 11, in accordance with control of the control part 31. Here, the spread angle is an angle indicative of the degree of convergence or divergence of the laser light.

The reflection mirror 13d reflects the laser light 12, which is outputted from the focus position adjustment section 17, toward the scanning section 13.

The scanning section 13 reflects the laser light 12 incident thereon from the reflection mirror 13d, and emits the laser light 12 as scanning light 14 toward the light deflection section 16. At this time, the scanning section 13 scans a predetermined area (hereinafter, referred to as a to-be-scanned area) of the light deflection section 16 using the scanning light 14 in accordance with control of the control part 31.

The light deflection section 16 performs wavefront conversion and reflection of the scanning light 14 incident thereon from the scanning section 13, and leads the scanning light 14 to the cornea 15 of the eye 20. The light deflection section 16 is typically a hologram mirror.

Here, a part of the scanning light 14 incident on the cornea 15 is reflected on the surface of the cornea 15, and reaches the light deflection section 16 as reflected light 18. It is noted that the other part of the scanning light 14 incident on the cornea 15 reaches the retina 20a, and hence the user recognizes an image. The light deflection section 16 reflects the reflected light 18 incident thereon. Then, the scanning section 13 is disposed at a position where the reflected light 18 reflected by the light deflection section 16 is incident. In other words, the scanning section 13 and the cornea 15 have an optically conjugate relation through the light deflection section 16.

The light detection section 19 is disposed so as to be adjacent to the scanning section 13, and detects the reflected light 18 incident on the scanning section 13 that has an optically conjugate relation with the cornea 15.

The control section 31a of the control part 31 controls the laser light source 11 and the scanning section 13 as described above. In addition, the control section 31a controls the focus position adjustment section 17 to precisely change the spread angle of the laser light 12 such that a later-described initial setting signal stored in the storage section 52 in advance agrees with a detection signal obtained by the light detection section 19 detecting the reflected light 18. Thus, the control part 31 is capable of performing scanning (projection) while constantly locating the focus 20b of the scanning light 14 on the retina 20a.

Figure 2:
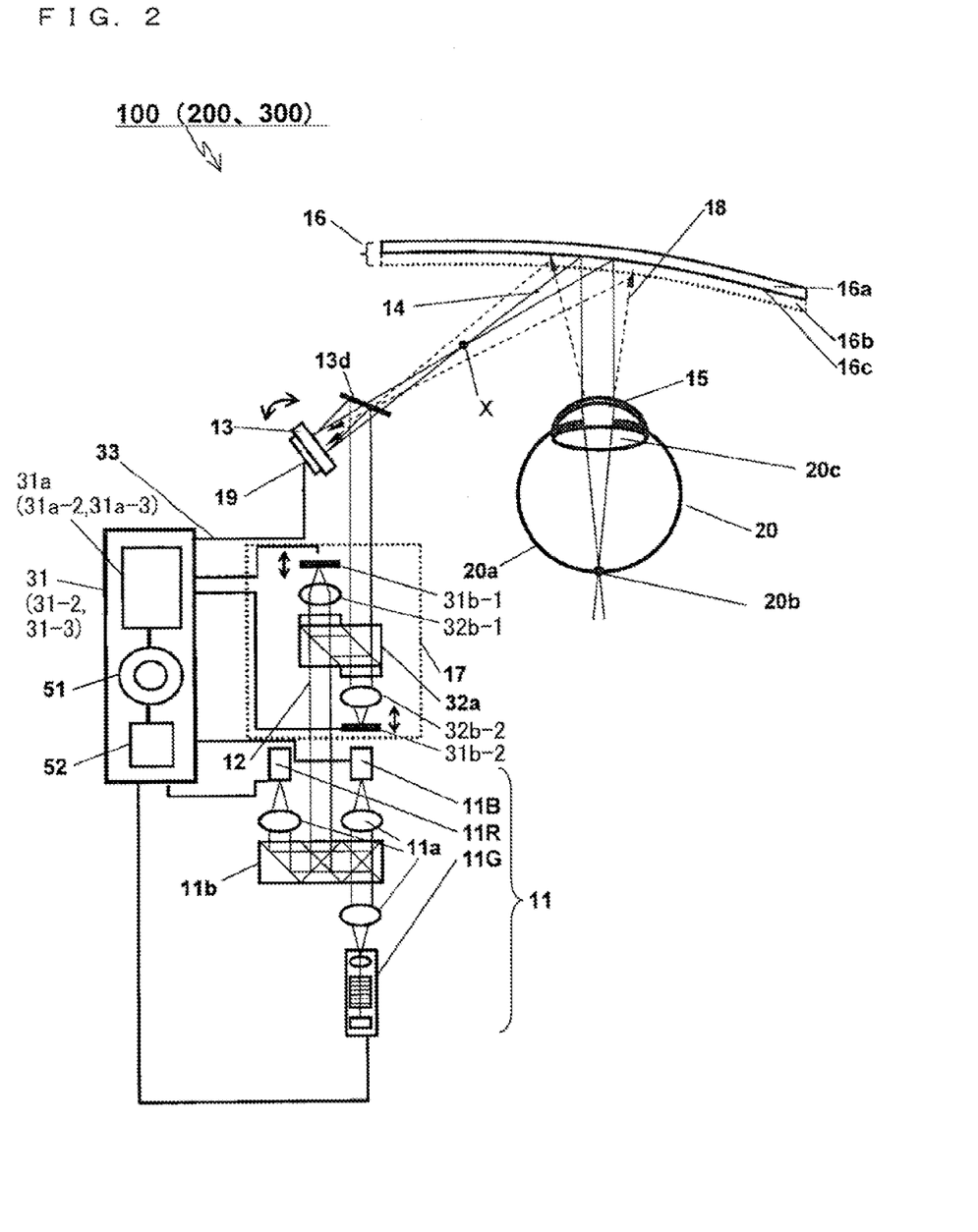
FIG. 2 shows an example of internal configurations of a laser light source 11 and a focus position adjustment section 17 of the image display apparatus 100 shown in FIG. 1 according to the first embodiment of the present invention.

FIG. 2 shows an example of internal configurations of the laser light source 11 and the focus position adjustment section 17 of the image display apparatus 100 shown in FIG. 1. It is noted that FIG. 1 show's a moment when the scanning light 14 is incident on the eye 20 from an oblique direction, but FIG. 2 shows a moment when the scanning light 14 is incident on the eye 20 from its front side. The following will describe in detail the image display apparatus 100 with reference to FIG. 2.

The laser light source 11 is an RGB light source, and includes a red laser light source (hereinafter, referred to as an R light source) 11R, a green laser light source (hereinafter, referred to as a G light source) 11G, a blue laser light source (hereinafter, referred to as a B light source) 11B, three collimator lenses 11a that correspond to the R, G, and B laser light sources 11R, 11G, and 11B, respectively, and a dichroic prism 11b. For example, a semiconductor laser that emits laser light with a wavelength of 630 to 660 nm is used as the R light source 11R, a semiconductor laser that emits laser light with a wavelength of 440 to 460 nm is used as the B light source 11B. For example, a semiconductor laser pumped SHG (Second Harmonic Generation) laser that emits laser light that is SHG light with a wavelength of 530 to 550 nm is used as the G light source 11G.

Each of the R light source 11R, the G light source 11G, and the B light source 11B emits laser light, and changes the intensity and the color of the emitted laser light in accordance with control of the control part 31. The laser light emitted from the R light source 11R, the G light source 11G, and the B light source 11B is incident on the respective collimator lenses 11a. Each collimator lens 11a converts the incident laser light into collimated light, and emits the collimated light to the dichroic prism 11b. The dichroic prism 11b superimposes the three types of the incident laser light on each other, and emits the laser light as the laser light 12.

The focus position adjustment section 17 includes servo-driven mirrors 31b-1 and 31b-2, cylindrical lenses 32b-1 and 32h-2, and a prism 32a. The laser light 12 emitted from the laser light source 11 is incident on the servo-driven mirror 31b-1 after passing through the cylindrical lens 32b-1. Here, the cylindrical lens 32b-1 has a curvature within a horizontal plane (hereinafter, referred to merely as a horizontal plane) that is parallel to the traveling direction of the laser light 12. The servo-driven mirror 31b-1 reflects the laser light 12 incident thereon, so as to cause the laser fight 12 to be incident on the cylindrical lens 32b-1 again. Here, the servo-driven mirror 31b-1 moves in the direction of an arrow in FIG. 2 in accordance with control of the control part 31, and adjusts the spread angle of the laser light 12 in the horizontal plane. The cylindrical lens 32b-1 allows the laser light 12 incident thereon from the servo-driven mirror 31b-1 to pass therethrough, causing the laser light 12 to be incident on the prism 32a. The prism 32a leads the laser light 12 incident thereon from the cylindrical lens 32b-1 to the cylindrical lens 32b-2. The laser light 12 outputted from the prism 32a is incident on the servo-driven mirror 31b-2 after passing through the cylindrical lens 32b-2. Here, the cylindrical lens 32b-2 has a curvature within a vertical plane (hereinafter, referred to merely as a vertical plane) that is parallel to the traveling direction of the laser light 12. In other words, the cylindrical lens 32b-2 has a curvature within the vertical plane perpendicular to the horizontal plane within which the cylindrical lens 32b-1 has the curvature. The servo-driven mirror 31b-2 reflects the laser light 12 incident thereon, causing the laser light 12 to be incident on the cylindrical lens 32b-2 again. Here, the servo-driven mirror 31b-2 moves in the direction of an arrow in FIG. 2 in accordance with control of the control part 31, and adjusts the spread angle of the laser light 12 in the vertical plane. The cylindrical lens 32b-2 allows the laser light 12 incident thereon, from the servo-driven mirror 31b-2 to pass therethrough, and emits the laser light 12 as an output of the focus position adjustment section 17.

According to the configuration, described above, the focus position adjustment section 17 is capable of adjusting the focus position X of the scanning light 14 by moving the servo-driven mirrors 31b-1 and 31b-2 in accordance with control of the control part 31. Further, the focus position adjustment section 17 is capable of performing focus adjustment of the scanning light 14 independently in the horizontal plane and the vertical plane by moving the servo-driven mirrors 31b-1 and 31b-2 independently in accordance with control of the control part 31. It is noted that the cylindrical lens 32b-1 may have a curvature within the vertical plane of the laser light 12 and the cylindrical lens 32b-2 may have a curvature within the horizontal plane of the laser light 12.

The reflection mirror 13d reflects the laser light 12, which is outputted from the focus position adjustment section 17, toward the scanning section 13.

Figure 3:
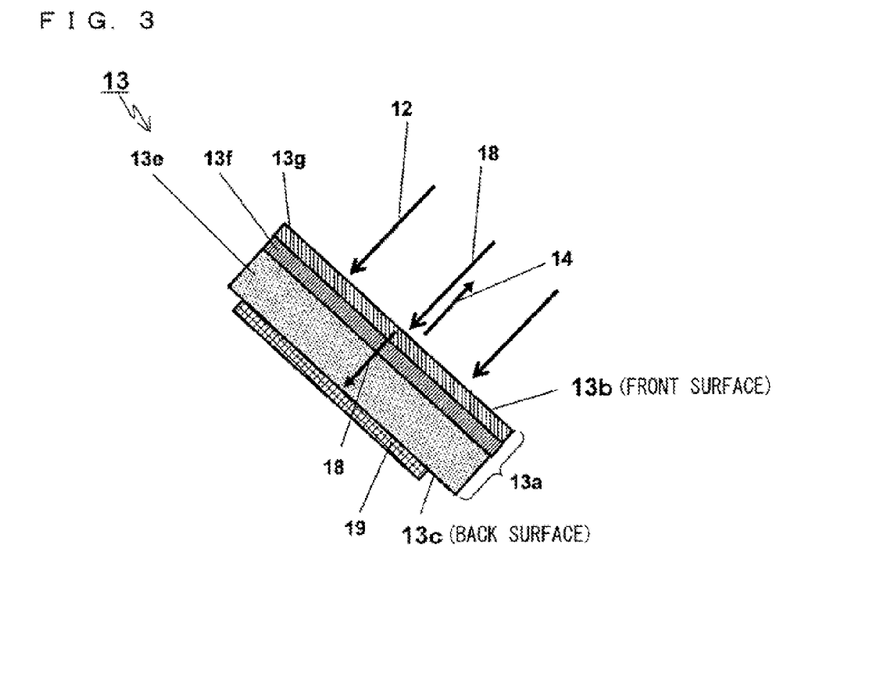
FIG. 3 shows an example of a scanning section 13 of the image display apparatus 100 according to the first embodiment of the present invention.

FIG. 3 shows an example of the scanning section 13 of the image display apparatus 100. As shown in FIG. 3, the scanning section 13 includes a scan mirror 13a and a drive part (not shown in FIGS. 1 to 3) for changing the angle of the scan mirror 13a. The scan mirror 13a is constituted of a base material 13e, a quarter wavelength plate 13g, and a polarized light reflection mirror 13f positioned between the base material 13e and the quarter wavelength plate 13g. In FIG. 3, the light detection section 19 that is in contact with a back surface of the scan mirror 13a is shown.

The following will describe an operation of the scan mirror 13a, using a case where the laser light 12 incident from the reflection mirror 13d is circularly polarized light. The quarter wavelength plate 13g allows the laser light 12 (circularly polarized light) incident thereon from the reflection mirror 13d to pass therethrough, and converts the laser light 12 into P-polarized light. The polarized light reflection mirror 13f reflects, as the scanning light 14, the P-polarized light mat has passed through the quarter wavelength plate 13g. The quarter wavelength plate 13g allows the P-polarized light (the scanning light 14) reflected by the polarized light reflection mirror 13f to pass therethrough, and converts the P-polarized light back into circularly polarized light. Through such an operation, the scan mirror 13a reflects the laser light 12, which is incident thereon from the reflection mirror 13d, as the scanning light 14 toward the light deflection section 16. Here, the reflected light 18 coming via the light deflection section 16 from the cornea 15 of the eye 20 that has an optically conjugate relation with a front surface 13b of the scanning section 13, is also incident on the quarter wavelength plate 13g. The quarter wavelength plate 13g allows the reflected light 18 to pass therethrough, and converts the reflected light 18 into S-polarized light that is polarized in a direction perpendicular to that of the aforementioned P-polarized light. The polarized light reflection mirror 13f allows the S-polarized light that has passed through the quarter wavelength plate 13g to pass therethrough, causing the S-polarized light to be incident on the light detection section 19 through the base material 13e. As described above, the scanning section 13 reflects the laser light 12 incident thereon from the reflection mirror 13d and emits the laser light 12 as the scanning light 14 toward the light deflection section 16, while allowing the reflected light 18 incident thereon from the cornea 15 via the light deflection section 16 to pass therethrough, causing the reflected light 18 to be incident on the light detection section 19.

Further, the scanning section 13 scans the to-be-scanned area on the light deflection section 16 using the scanning light 14 with a predetermined spot size by driving the drive part and changing the angle of the scan mirror 13a in accordance with control of the control part 31. Here, in FIGS. 1 and 2, the reflection mirror 13d seems to block the scanning light 14 and the reflected light 18. However, actually, the reflection mirror 13d is disposed so as not to block the scanning light 14 from being incident on the light deflection section 16 and the reflected light 18 from being incident on the scanning section 13.

As shown in FIGS. 1 and 2, the light deflection section 16 includes a base material 16a and a hologram mirror 16b formed on at least apart of a surface of the base material 16a. The hologram mirror 16b is constituted of a thin diffractive optical element, which is produced by disposing a point light source at the position of the scanning section 13; disposing a converging light source, which emits light that converges, at the position of the cornea 15; and performing interference exposure of a hologram material disposed at the position of the light deflection section 16. The hologram mirror 16b constantly reflects the scanning light 14, which is incident thereon from the scanning section 13, toward the cornea 15. Further, the hologram mirror 16b constantly reflects the reflected light 18, which is incident thereon from the cornea 15, toward the scanning section 13. In other words, the scanning light 14 emitted by the scanning section 13 is entirely incident on the cornea 15, and the reflected light 18 reflected by the cornea 15 is entirely incident on the scanning section 13. The scanning section 13 and the cornea 15 have an optically conjugate relation through the light deflection section 16. It is noted that a part of the scanning light 14 incident on the cornea 15 from the hologram mirror 16b passes through the cornea 15 and reaches the retina 20a, and hence the user recognizes an image.

As shown in FIG. 3, the light detection section 19 is disposed so as to be in contact with a back surface 13c of the scanning section 13, and detects the reflected light 18 from the cornea 15 which has passed through the scanning section 13. Here, as described above, the scanning section 13 and the cornea 15 have an optically conjugate relation through the light deflection section 16. Thus, a state of the scanning light 14 incident on the cornea 15 can be indirectly detected by the light detection section 19 detecting the reflected light 18 incident on the scanning section 13. By disposing the light detection section 19 so as to be in contact with the back surface 13c of the scanning section 13, the reflected light 18 can be efficiently detected, and the light detection section 19 and the scanning section 13 can be simple and compact in structure.

Figure 4:
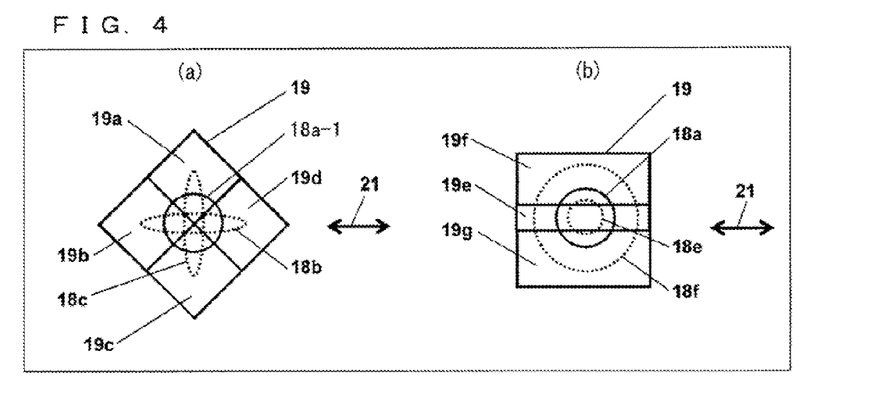
FIG. 4 is a view for explaining an example of a method for detecting an incidence state of scanning light 14 on a cornea 15 by a light detection section 19 of the present invention detecting reflected light 18 from the cornea 15.

FIG. 4 is a view for explaining an example of a method for detecting an incidence state of the scanning light 14 on the cornea 15 by the light detection section 19 detecting the reflected light 18 from the cornea 15. FIG. 4(a) shows a case where the light detection section 19 detects red light (the light of the R light source 11R) or blue light (the light of the B light source 11B) among the reflected light 18. FIG. 4(b) shows a case where the light detection section 19 detects green light (the light of the G light source 11G) among the reflected light 18. The method shown in FIGS. 4(a) and 4(b) is a method generally used for detecting a signal of an optical disc and the like, and hence it will be described briefly below.

First, the case where the light detection section 19 detects the red light (the light of the R light source 11R) or the blue light (the light of the B light source 11B) will be described with reference to FIG. 4(a). Here, because the R light source 11R and the B light source 11B are semiconductor laser light sources, the position of the emitted point of a horizontal component of laser light is shifted from the position of the emitted point of a vertical component of the laser light by several micrometers to 20 μm. Thus, the laser lights of the R light source 11R and the B light source 11B have astigmatism. The method of FIG. 4(a) uses the astigmatism for detecting an incidence state of the scanning light 14 on the cornea 15.

As shown in FIG. 4(a), the detection surface of the light detection section 19 has a square shape that is rotated at an angle of 45° relative to the horizontal direction, and is divided into four light detection regions 19a, 19b, 19c, and 19d. Here, amounts light detected at the light detection regions 19a, 19b, 19c, and 19d are represented by A19, B19, C19, and D19, respectively. The light detection section 19 performs calculation of (A19+C19)−(B19+D19) to generate a detection signal as the calculation result. Here, in a focused state where the focus 20b of the scanning light 14 is located on the retina 20a of an eye 20 of a user as shown in FIG. 2, it is assumed that the reflected light 18 is detected in a circular spot shape 18a-1. In this case, the detection signal becomes "0". When the focus position X of the scanning light 14 shown in FIG. 2 approaches the light deflection section 16 by the focus position adjustment section 17 changing the spread angle of the laser light 12 and the focus 20b moves from the retina 20a so as to approach the light deflection section 16, the reflected light 18 is detected, for example, in a horizontally oblong spot shape 18b due to the characteristics of the laser lights of the R light source 11R and the B light source 11B, which have astigmatism. In this case, the detection signal becomes a negative value. On the other hand, when the focus position X of the scanning light 14 shown in FIG. 2 moves so as to increase the distance from the light deflection section 16 by the focus position adjustment section 17 changing the spread angle of the laser light 12 and the focus 20b moves from the retina 20a so as to increase the distance from the light deflection section 16, the reflected light 18 is detected, for example, in a vertically oblong spot shape 18c due to the characteristics of the laser lights of the R light source 11R and the B light source 11B, which have astigmatism. In this case, the detection signal becomes a positive value. In other words, the closer the focus 20b is to the light deflection section 16, the smaller the value of the detection signal of the light detection section 19 is; and the farther the focus 20b is from the light deflection section 16, the greater the value of the detection signal of the light detection section 19 is. Thus, the detection signal of the light detection section 19 indicates the position of the focus 20b with respect to the retina 20a. As a result, the light detection section 19 is capable of detecting the positional relation between the retina 20a and the focus 20b by detecting the incidence state of the scanning light 14 on the cornea 15. Here, because the eye 20 has different characteristics (shortsightedness, farsightedness, etc.) per user, the spot shape (detection signal) detected by the light detection section 19 when the focus 20b is located on the retina 20a is different for each user. Thus, a later-described initial setting operation needs to be performed for setting a spot shape (detection signal), which is detected by the light detection section 19 when the focus 20b is located on the retina 20a, as an initial setting signal.

Next, the case where the light detection section 19 detects the light of a green component (the light of the G light source 11G) will be described with reference to FIG. 4(b). Because the G light source is the SHG laser light source, the laser light of the G light source 11G basically does not have astigmatism. The method of FIG. 4(b) uses a spot size of the reflected light 18 on the light detection section 19 for detecting the incidence state of the scanning light 14 on the cornea 15.

As shown in FIG. 4(b), the detection surface of the light detection section 19 is divided into a central light detection region 19e, an upper light detection region 19f, and a lower light detection region 19g by two parallel lines parallel to the horizontal direction 21. Here, amounts of light detected at the light detection regions 19e, 19f, and 19g are represented by E19, F19, and G19, respectively. The light detection section 19 performs calculation of (E19)−(F19+G19) to generate a detection signal as the calculation result. Here, in a focused state where the focus 20b of the scanning light 14 is located on the retina 20a of an eye 20 of a user as shown in FIG. 2, it is assumed that the reflected light 18 is detected with a spot size 18a and the value of the detection signal is Z. When the focus position X of the scanning light 14 shown in FIG. 2 approaches the light deflection section 16 by the focus position adjustment section 17 changing the spread angle of the laser light 12 and the focus 20b moves from the retina 20a so as to approach the light deflection section 16, the reflected light 18 is detected with a spot size 18e smaller than the spot size 18a. In this case, the detection signal becomes a value greater than Z. On the other hand, when the focus position X of the scanning light 14 shown in FIG. 2 moves so as to increase the distance from the light deflection section 16 by the focus position adjustment section 17 changing the spread angle of the laser light 12 and the focus 20b moves from the retina 20a so as to increase the distance from the light deflection section 16, the reflected light 18 is detected with a spot size 18f larger than the spot size 18a. In this case, the detection signal becomes a value smaller than Z. In other words, the closer the focus 20b is to the light deflection section 16, the greater the value of the detection signal of the light detection section 19 is; and the farther the focus 20b is from the light deflection section 16, the smaller the value of the detection signal of the light detection section 19 is. Thus, the detection signal of the light detection section 19 indicates the position of the focus 20b with respect to the retina 20a. As a result, the light detection section 19 is capable of detecting the positional relation between the retina 20a and the focus 20b by detecting the incidence state of the scanning light 14 on the cornea 15. Here, because the eye 20 has different characteristics (shortsightedness, farsightedness, etc.) per user, the spot size (detection signal) detected by the light detection section 19 when the focus 20b is located on the retina 20a is different for each user. Thus, the later-described initial setting operation needs to be performed for setting a spot size (detection signal), which is detected by the light detection section 19 when the focus 20b is located on the retina 20a, as an initial setting signal.

As described above, the light detection section 19 indirectly detects a state of the scanning light 14 incident on the cornea 15 by detecting the reflected light 18 incident on the scanning section 13, and hence is capable of detecting the positional relation between the retina 20a and the focus 20b.

As shown in FIGS. 1 and 2, the control part 31 includes the control section 31a, the adjustment section 51, and the storage section 52. The control section 31a controls the laser light source 11 so as to change the intensity and the color of the laser light 12 for projecting an image on the retina 20a of the eye 20. In addition, the control section 31a controls the scanning section 13 to scan the to-be-scanned area of the light deflection section 16 using the scanning light 14. Further, the control section 31a controls the focus position adjustment section 17 to precisely change the spread angle of the laser light 12 such that the initial setting signal stored in the storage section 52 in advance agrees with the detection signal detected by the light detection section 19. Here, the initial setting signal is a detection signal detected by the light detection section 19 during the later-described initial setting operation. The adjustment section 51 is, for example, a dial and operates the focus position adjustment section 17 in accordance with a manual operation of the user during the later-described initial setting operation and adjusts the spread angle of the laser light 12. The storage section 52 stores the initial setting signal detected by the light detection section 19 during the later-described initial setting operation. The laser light source 11, the scanning section 13, and the focus position adjustment section 17 are connected to the control part 31 via wires 33 and electrically controlled by the control part 31.

Figure 5:
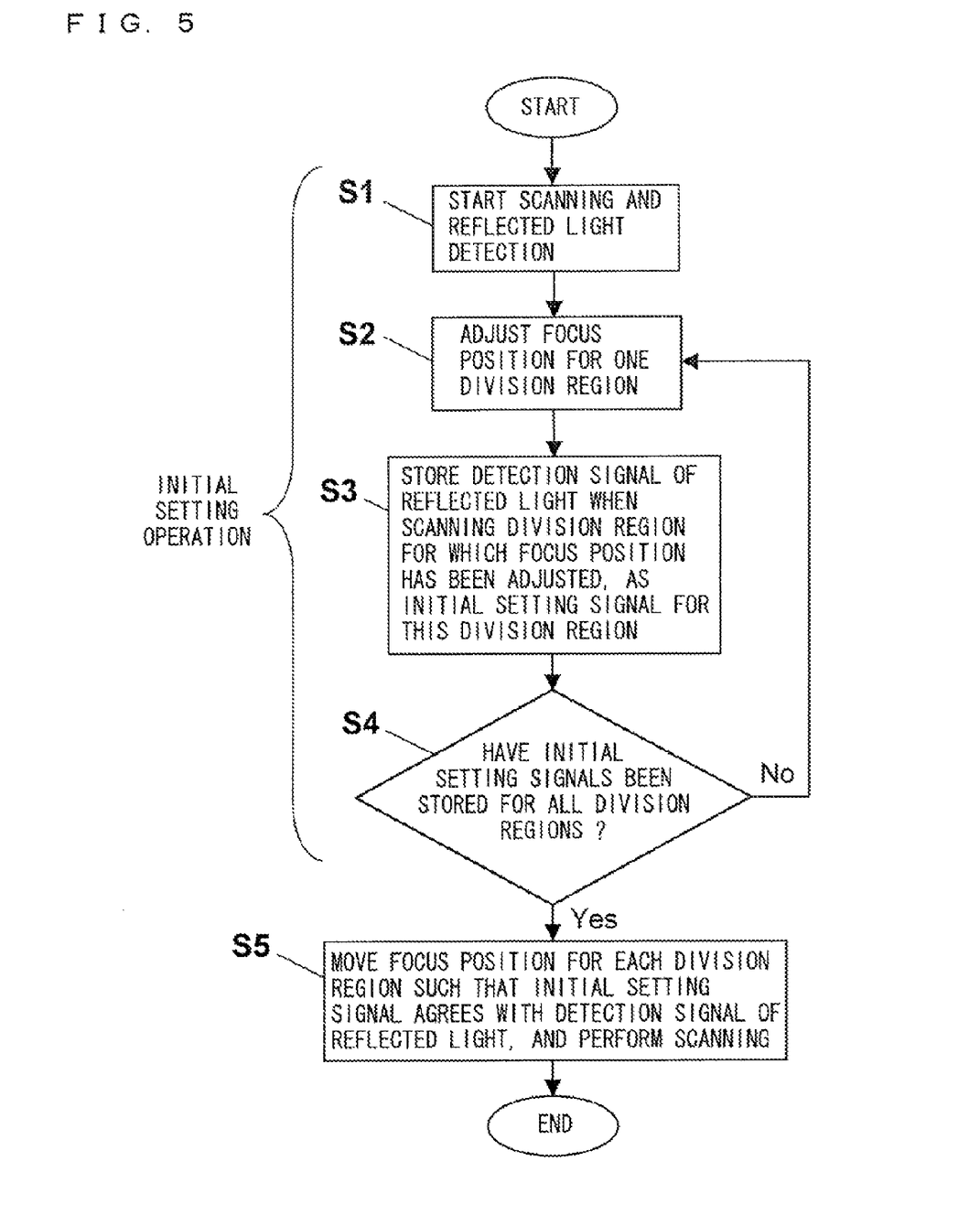
FIG. 5 is a flow chart for explaining an operation of the image display apparatus 100 according to the first embodiment of the present invention.

FIG. 5 is a flow chart for explaining an operation of the image display apparatus 100. In FIG. 5, steps S1 to S4 make up the initial setting operation, and a step S5 is an operation that causes the user to view an image. The initial setting operation including the steps S1 to S4 is basically performed when a user uses the image display apparatus 100 for the first time, or when a user is changed, etc. The following will describe an operation of the image display apparatus 100 with reference to FIG. 5.

Figure 6:
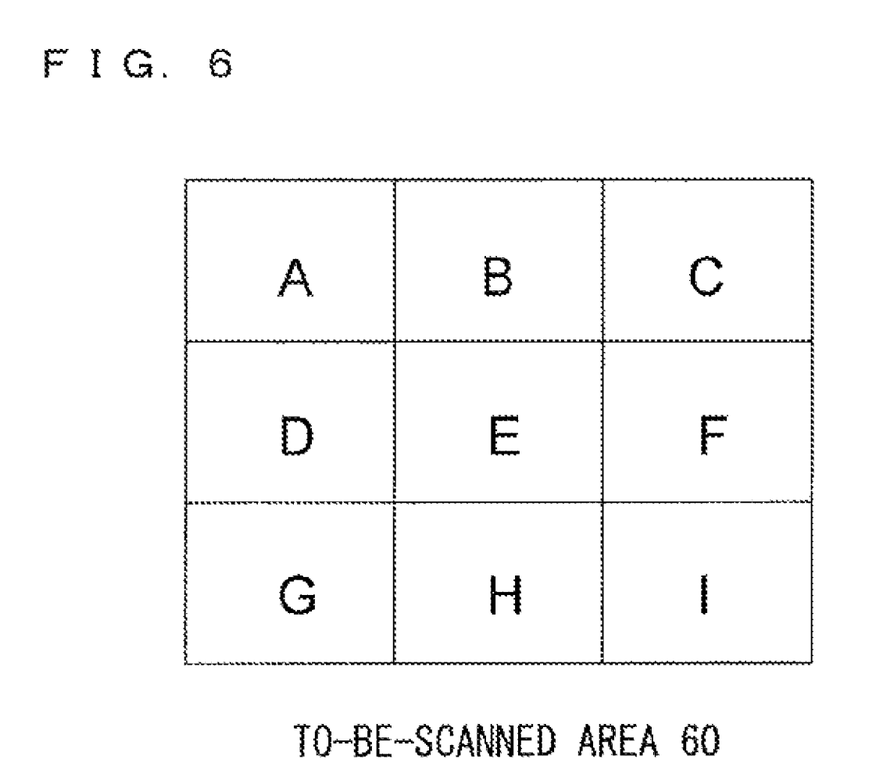
FIG. 6 is a view of a to-be-scanned area 60 on a light deflection section, which is scanned by the scanning section 13 of the present invention, using scanning light 14.

First, at the step S1, the scanning section 13 changes the emitted direction of the scanning light 14 in accordance with control of the control part 31, and starts scanning of the to-be-scanned area on the light deflection section 16. FIG. 6 shows a to-be-scanned area 60 on the light deflection section 16 which is scanned by the scanning section 13 using the scanning light 14. In FIG. 6, as one example, the to-be-scanned area 60 is divided into nine division regions A to I. By the scanning by the scanning section 13, the scanning light 14 is incident on the cornea 15 via the light deflection section 16, and a part of the scanning light 14 is reflected by the cornea 15 as the reflected light 18, and the other part of the scanning light 14 passes through the cornea 15 and reaches the retina 20a. The reflected light 18 is incident on the scanning section 13 via the light deflection section 16. Further, at the step S1, the light detection section 19 starts detection of the reflected light 18 incident on the scanning section 13. At this time, the laser light source 11 changes the intensity and the color of the laser light 12 in accordance with control of the control part 31, and emits the laser light 12 to the focus position adjustment section 17. In addition, the focus position adjustment section 17 changes the incident laser light 12 to laser light 12 with a constant spread angle in accordance with control of the control part 31, and emits the laser light 12. In other words, at the step S1, the image display apparatus 100 starts projection on the retina 20a, and starts detection of the incidence state of the scanning light 14 on the cornea 15.

Next, at the step S2, the user operates the adjustment section 51 such that the user can also most clearly view an image in the division region A while looking at the division region E located at the center of the to-be-scanned area 60 shown in FIG. 6. In other words, at the step S2, in accordance with an instruction from the user, the adjustment section 51 of the control part 31 adjusts the spread angle of the laser light 12, which is emitted by the focus position adjustment section 17 when the division region A is scanned. Thus, the adjustment section 51 is capable of adjusting the focus position X of the scanning light 14 during scanning of the division region A such that the focus 20b is accurately located on the retina 20a.

Next, at the step S3, the storage section 52 stores, as an initial setting signal for the division region A, a detection signal of the reflected light 18 detected by the light detection section 19 during the scanning of the division region A.

Next, at the step S4, the control section 31a determines whether or not initial setting signals for all of the division regions A to I have been stored in the storage section 52. Here, only the initial setting signal for the division region A has been stored in the storage section 52, and the processing returns to the step S2.

At the step S2, the same process as for the division region A is performed for the division region B, and the adjustment section 51 adjusts the focus position X of the scanning light 14 during scanning of the division region B such that the focus 20b is accurately located on the retina 20a. Next, at the step S3, the storage section 52 stores, as an initial setting signal for the division region B, a detection signal of the reflected light 18 detected by the light detection section 19 during the scanning of the division region B. Then, as a result of the step S4, the processing returns to the step S2. After that, similarly, the processes of the steps S2 and S3 are repeated, and the storage section 52 stores the initial setting signals for all of the division regions A to I at the step S3.

According to the above initial setting operation, the storage section 52 stores, as the initial setting signal for each of the division regions A to I, the incidence state of the scanning light 14, whose focus 20b is located on the retina 20a, on the cornea 15.

Next, at the step S4, the control section 31a determines that the initial setting signals for all of the division regions A to I have been stored in the storage section 52, and the processing advances to the step S5 that causes the user to view an image.

Next, at the step S5, the control section 31a changes the spread angle of the laser light 12, which is emitted by the focus position adjustment section 17, for each of the division regions A to I such that the initial setting signal stored in the storage section 52 agrees with the detection signal of the reflected light 18 detected by the light detection section 19, and causes the scanning section 13 to scan the to-be-scanned area 60. Specifically, at the step S5, for example, when scanning the division region A, the control section 31a adjusts the spread angle of the laser light 12, which is emitted by the focus position adjustment section 17, such that the initial setting signal for the division region A agrees with the detection signal of the light detection section 19. Similarly, at the step S5, for example, when scanning the division region B, the control section 31a adjusts the spread angle of the laser light 12, which is emitted by the focus position adjustment section 17, such that the initial setting signal for the division region B agrees with the detection signal of the light detection section 19.

As described above, the image display apparatus 100 according to the first embodiment adjusts the spread angle of the laser light 12 (i.e. the focus position X of the scanning light 14) when scanning each of the division regions A to I of the to-be-scanned area 60, in accordance with an instruction from the user such that the user can actually clearly view an image. Then, the image display apparatus 100 detects the reflected light 18 from the cornea 15 when the spread angle of the laser light 12 is adjusted in scanning each of the division regions A to I, and stores each detection signal as an initial setting signal. Then, at the operation that causes the user to view an image, the image display apparatus 100 changes the spread angle of the laser light 12 (i.e. the focus position X of the scanning light 14) for each of the division regions A to I to be scanned, such that the initial setting signal agrees with the detection signal of the reflected light 18 from the cornea 15. Thus, the image display apparatus 100 can constantly locate the focus 20b of the scanning light on the retina 20a.

As described above, the image display apparatus 100 does not perform focus adjustment of the scanning light using the reflected light from the retina whose amount is very small like a conventional technology, and performs focus adjustment of the scanning light using the reflected light from the cornea whose amount is relatively large. The amount of the reflected light from the cornea is stable regardless of the incident angle of the scanning light on the eye 20, unlike the amount of the reflected light from the retina. Thus, the image display apparatus 100 is capable of constantly accurately performing focus adjustment of the scanning light regardless of the incident angle of the scanning light on the eye 20, and hence the image display apparatus 100 is capable of constantly accurately adjusting the image formation state on the retina. As a result, the image display apparatus 100 according to the first embodiment is capable of constantly providing a clear image in the entire visual field of the user.

Here, the image display apparatus 100 is generally in the form of glasses. Thus, the interval between the light deflection section 16 and the cornea 15 is easy to change (see FIG. 2). In particular, when the user takes off the image display apparatus 100 and wears it again, the interval between the light deflection section 16 and the cornea 15 changes. Even in this case, because the image display apparatus 100 changes the spread angle of the laser light 12 (i.e. the focus position X of the scanning light 14) such that the initial setting signal, agrees with the detection signal of the reflected light 18 from the cornea 15 as described above, the cornea 15 is irradiated with the scanning light 14 in the same state as that at the initial setting, and hence the focus 20b can be constantly located on the retina 20a.

It is noted that the focus position adjustment section 17 is disposed outside an optical system constituted of the scanning section 13 (light detection section 19), the light deflection section 16, and the cornea 15. Thus, the focus position adjustment section 17 is capable of adjusting the focus position X of the scanning light 14 while maintaining the optical conjugate relation between the scanning section 13 (light detection section 19) and the cornea 15 through the light deflection section 16.

Further, the focus position adjustment section 17 is preferably disposed at a position distant from the scanning section 13 which vibrates during the scanning operation. Thus, the focus position adjustment section 17 is capable of precisely driving the servo-driven mirrors 31b-1 and 31b-2 while suppressing the influence of the vibration of the scanning section 13.

Further, because the image display apparatus 100 according to the first embodiment projects an image using the laser light 12 including RGB light, a compact HMD having excellent color reproducibility and low power consumption as compared to an image display apparatus that projects an image using a liquid crystal panel or the like, can be realized.

Further, because the image display apparatus 100 according to the first embodiment uses the SHG laser as the G light source 11G, a high-power HMD having further excellent color reproducibility can be realized.

Further, the above has described the case where the laser light source 11 includes the R light source 11R, the G light source 11G, and the B light source 11B. However, the laser light source 11 may include one or two of the R light source 11R, the G light source 11G, and the B light source 11B.

Further, in the image display apparatus 100 according to the first embodiment, the case where the adjustment section 51 is incorporated in the control part 31 has been described. However, the adjustment section 51 may be detachable from the control part 31, and may be mounted to the control part 31 only at the initial setting operation described with reference to FIG. 5. Thus, the size and the weight of the apparatus wore by the user when viewing an image can be reduced.

Further, in the above description, the user operates the adjustment section 51 during the initial setting operation described with reference to FIG. 5. However, during the initial setting operation described with reference to FIG. 5, a person receiving an instruction from the user may operate the adjustment section 51.

Second Embodiment

In addition to the features of the image display apparatus 100 according to the first embodiment, an image display apparatus 200 according to a second embodiment has a feature of detecting the view line direction of a user, providing a clear image in a region (a central visual region of the user) corresponding to the detected view line direction, and providing a relatively unclear image in the other regions (a peripheral visual region of the user).

The image display apparatus 200 according to the second embodiment has a configuration in which the control part 31 of the image display apparatus 100 according to the first embodiment is replaced with a control part 31-2. The control part 31-2 of the image display apparatus 200 has a configuration in which the control section 31a of the control part 31 of the image display apparatus 100 is replaced with a control section 31a-2. Thus, the following will describe the difference from the image display apparatus 100 according to the first embodiment with reference to FIG. 2. For the same content as that of the image display apparatus 100 according to the first embodiment, the description thereof will be basically omitted.

FIG. 2 shows the case where the scanning light 14 is incident on the cornea 15 from the view line direction of the user. In the state of FIG. 2, in addition to the reflected light 18 from the surface of the cornea 15 the light detection section 19 detects reflected light from interfaces of a crystalline lens 20c, the retina 20a, and the like. Thus, in the state of FIG. 2 where the scanning light 14 is incident on the cornea 15 from the view line direction of the user, the amount of light detected by the light detection section 19 reaches a peak. Using this, the control section 31a-2 detects the peak of the amount of light detected by the light detection section 19 to detect the view fine direction of the user.

Here, the eyesight of a human eye is strong in the central visual field adjacent to the view line direction while being weak in the peripheral visual field. The control section 31a-2 identifies the central visual region of the user by detecting the view line direction of the user. Then, the control section 31a-2 increases the accuracy of the spread angle adjustment of the laser light 12, which is performed by controlling the focus position adjustment section 17, during scanning of the central visual region of the user using the scanning light 14, and decreases the accuracy of the spread angle adjustment of the laser light 12 during scanning of the peripheral visual region of the user using the scanning light 14. In addition, the control section 31a-2 increases the modulation, frequencies of the intensity and the color of the laser light 12, which are changed by controlling the laser light source 11, during the scanning of the central visual region of the user using the scanning light 14, and decreases the modulation frequencies of the intensity and the color of the laser light 12 during the scanning of the peripheral visual region of the user using the scanning light 14. In other words, the control section 31a-2 controls the laser light source 11 to increase the resolution of a projected image in the central visual region of the user and to decrease the resolution of a projected image in the peripheral visual region of the user.

As described above, the image display apparatus 200 according to the second embodiment changes the clearness of a projected image between the central visual region and the peripheral visual region based on the detected view line direction of the user. As a result, the image display apparatus 200 according to the second embodiment provides a sufficiently clear image to the user while providing the same effects as the image display apparatus 100 according to the first embodiment. Thus, the reduction of control power can be achieved.

In the second embodiment, the control section 31a-2 controls the accuracy of the spread angle adjustment of the laser light 12 and the resolution of an image based on the view line direction of the user. However, the control section 31a-2 may control only one of them.

Third Embodiment

In addition to the features of the image display apparatus 100 according to the first embodiment, an image display apparatus 300 according to a third embodiment has a feature of detecting the view line direction of a user, and changing an initial setting signal, used for focus adjustment, so as to follow a change of the view line direction.

The image display apparatus 300 according to the third embodiment has a configuration in which the control part 31 of the image display apparatus 100 according to the first embodiment is replaced with a control part 31-3. The control part 31-3 of the image display apparatus 300 has a configuration in which the control section 31*a* of the control part 31 of the image display apparatus 100 is replaced with a control section 31*a*-3. Thus, the following will describe the difference from the image display apparatus 100 according to the first embodiment with reference to FIG. 2. For the same content as that of the image display apparatus 100 according to the first embodiment, the description thereof will be basically omitted.

Here, the initial setting signal used for focus adjustment is set during the initial setting operation described with reference to FIG. 5 in a state where the user looks at for division region E located at the center of the to-be-scanned area 60 shown in FIG. 6. In other words, the initial setting signal used for focus adjustment is set on the assumption that the user constantly looks at the division region E and the division region E constantly becomes the central visual region of the user.

The following will describe in detail a characteristic operation of the control section 31*a*-3 with reference to FIG. 6. Similarly as the control section 31*a*-2 of the image display apparatus 200 according to the second embodiment, the control section 31*a*-3 identifies the central visual region of the user.

First, a case where the user looks at the division region E and the division region E becomes the central visual region of the user will be described. In this case, similarly as the control section 31*a* of the first embodiment, during scanning of the division region. E using the scanning light 14, the control section 31*a*-3 adjusts the spread angle of the laser light 12, which is emitted by the focus position adjustment section 17, such that the initial setting signal for the division region E agrees with the detection signal of the light detection section 19, thereby performing focus adjustment. Similarly as the control section 31*a* of the first embodiment, during scanning of each of the division regions A to D and F to I, the control section 31*a*-3 adjusts the spread angle of the laser light 12, which is emitted by the focus position adjustment section 17, such that the initial setting signal for each of the division regions A to D and F to I agree with the detection signal of the light detection section 19, thereby performing focus adjustment.

Next, a case where the user looks at the division region F and the division region F becomes the central visual region of the user will be described as an example. In this case, during scanning of the division region F using the scanning light 14, the control section 31*a*-3 adjusts the spread angle of the laser light 12, which is emitted by the focus position adjustment, section 17, such that the initial setting signal for the division region E agrees with the detection signal of the light detection section 19, thereby performing focus adjustment. In addition, during the scanning of the division region E using the scanning light 14, the control section 31*a*-3 adjusts the spread angle of the laser light 12, which is emitted by the focus position adjustment section 17, such that the initial setting signal for the division region D agrees with the detection signal of the light detection section 19, thereby performing focus adjustment. Similarly, during the scanning of each of the division regions B, C, H, and I, the control section 31*a*-3 adjusts the spread angle of the laser light 12, which is emitted, by the focus position adjustment section 17, such that the initial setting signals tor each of the division regions A, B, G, and H agree with the detection signal of the light detection section 19, thereby performing focus adjustment.

As described above, the image display apparatus 300 according to the third embodiment detects the view line direction of the user, and appropriately changes the initial setting signal, used for focus adjustment, so as to follow a change of the view line direction. As a result, even when the view line direction of the user changes, the image display apparatus 300 according to the third embodiment is capable of constantly providing a clear image in the entire visual field of the user while providing the same effects as the image display apparatus 100 according to the first embodiment.

It is noted that when the division region F becomes the central visual region of the user as described above, the division regions A, D, and G are located outside the visual field of the user. Thus, during scanning of the division regions A, D, and G, the changing of the initial setting signal may not be performed, and focus adjustment may be performed using the initial setting signals for the division regions A, D, and G.

Further, the above-described features of the image display apparatuses 200 and 300 according to the second and third embodiments may be combined. In other words, the view line direction of the user may be detected and the clearness of a projected image may be changed between the central visual, region and the peripheral visual region, and in addition, the initial setting signal used for focus adjustment may be appropriately changed so as to follow a change of the view line direction.

While the invention has been described in detail, the foregoing description is in all aspects illustrative and not restrictive. It is understood that numerous other modifications and variations can be devised without departing from the scope of the invention.

What is claimed is:

1. An image display apparatus for displaying an image by irradiating an eye of a user with laser light, the image display apparatus comprising:
   a laser light source for emitting laser light;
   a focus position adjustment section for adjusting a focus position of the laser light by adjusting a spread angle of the laser light emitted by the laser light source;
   a scanning section for scanning a predetermined to-be-scanned area by using the laser light adjusted by the focus position adjustment section as scanning light;
   a light deflection section disposed at the predetermined to-be-scanned area for leading the scanning light to a cornea of the user;
   a light detection section disposed at a position where the light detection section has an optically conjugate relation with a surface of the cornea through the light deflection section, for detecting, as a reflected light, a part of the scanning light reflected on the surface of the cornea and generating a detection signal; and
   a control section for controlling the laser light source, the focus position adjustment section, and the scanning section,
   wherein the control section controls the focus position adjustment section to adjust the focus position of the laser light such that the detection signal generated by the light detection section agrees with an initial setting signal that is generated in advance by the light detection section during an initial setting operation.

2. The image display apparatus according to claim 1, further comprising:
   an adjustment section for, during the initial setting operation, focusing the scanning light on the retina of the eye of the user by operating the focus position adjustment section in accordance with an instruction from the user and adjusting the focus position of the laser light; and
   a storage section for, during the initial setting operation, storing the detection signal generated by the light detection section in a state where the scanning light is focused on the retina of the eye of the user, as an initial setting signal.

3. The image display apparatus according to claim 2, wherein:

during the initial setting operation, the adjustment section sequentially adjusts the focus position of the laser light for each of regions in the predetermined to-be-scanned area in accordance with an instruction from the user who looks straight at a center of the predetermined to-be-scanned area, thereby sequentially focusing the scanning light on the retina of the eye of the user for each of the regions; and during the initial setting operation, the storage section stores, as the initial setting signal constituted of a plurality of values respectively corresponding to the regions, a plurality of detection signals each generated by the light detection section in a state where the scanning light is focused on the retina of the eye of the user for each of the regions in the predetermined to-be-scanned area.

4. The image display apparatus according to claim 3, wherein the control section detects a view line direction of the user by detecting a peak of an amount of the reflected light detected by the light detection section, and changes a value of the initial setting signal, which is used for focus position adjustment performed by the focus position adjustment section, for each of the regions in the predetermined to-be-scanned area so as to follow a change of the detected view line direction.

5. The image display apparatus according to claim 1, wherein the control section detects a view line direction of the user by detecting a peak of an amount of the reflected light detected by the light detection section.

6. The image display apparatus according to claim 5, wherein the control section controls the focus position adjustment section to increase adjustment accuracy of the focus position during projecting of an image in a region of the detected view line direction, and to decrease the adjustment accuracy of the focus position during projecting of an image in another region.

7. The image display apparatus according to claim 5, wherein the control section controls the laser light source to increase a resolution of an image during projecting of an image in a region of the detected view line direction, and to decrease the resolution of an image during projecting of an image in another region.

8. The image display apparatus according to claim 1, wherein the focus position adjustment section is disposed so as not to block the scanning light and the reflected light.

9. The image display apparatus according to claim 1, wherein the scanning section includes a polarized light reflection mirror and a quarter wavelength plate, reflects the laser light, and allows the reflected light to pass therethrough.

10. The image display apparatus according to claim 9, wherein the light detection section is disposed on a back surface of the scanning section that is opposite to a surface of the scanning section that reflects the laser light, and detects the reflected light that has passed through the scanning section.

11. The image display apparatus according to claim 1, wherein the light deflection section includes a hologram mirror.

12. The image display apparatus according to claim 1, wherein the laser light source is an RGB light source including a red laser light source, a green laser light source, and a blue laser light source.

13. The image display apparatus according to claim 12, wherein the green laser light source is an SHG laser light source.

14. An image display method for displaying an image by irradiating an eye of a user with laser light, the image display method comprising:

a laser-emitting step of emitting laser light;

a focus position adjustment step of adjusting a focus position of the laser light by adjusting a spread angle of the laser light emitted at the laser-emitting step;

a scanning step of scanning a predetermined to-be-scanned area by using the laser light adjusted at the focus position adjustment step;

a light deflection step of leading the scanning light, which has scanned the predetermined to-be-scanned area, to a cornea of the user; and a light detection step of, at a position where there is an optically conjugate relation with a surface of the cornea through the predetermined to-be-scanned area, detecting, as a reflected light, a part of the scanning light reflected on the surface of the cornea and generating a detection signal, wherein at the focus position adjustment step, adjusting the focus position of the laser light such that the detection signal generated at the light detection step agrees with an initial setting signal generated in advance during an initial setting operation for the light detection.

\* \* \* \* \*